Feb. 6, 1940.  J. F. KÖHNKE  2,189,070
PIPE JOINT
Filed May 3, 1938
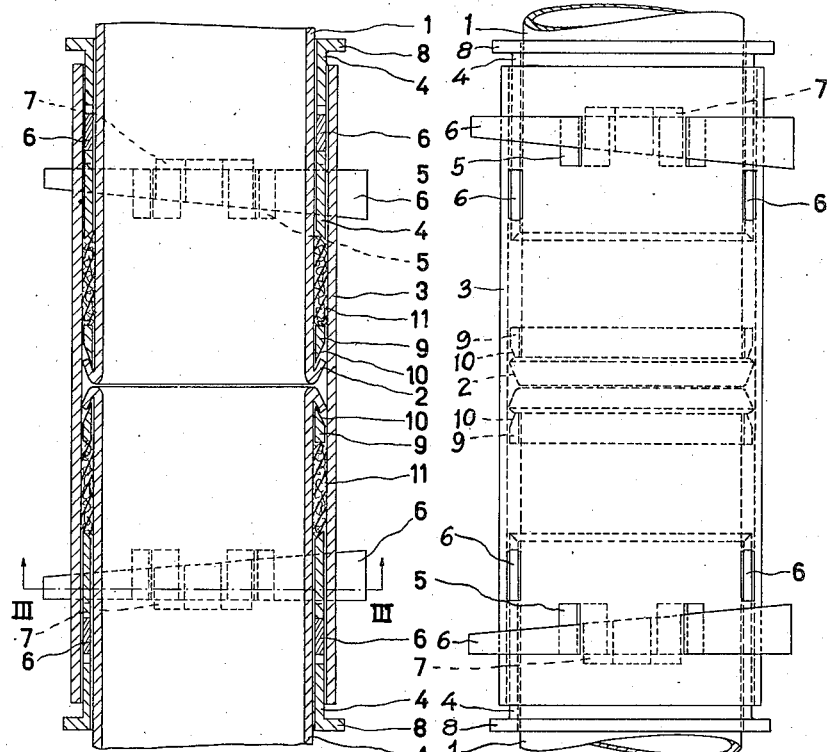
FIG·1   FIG·2
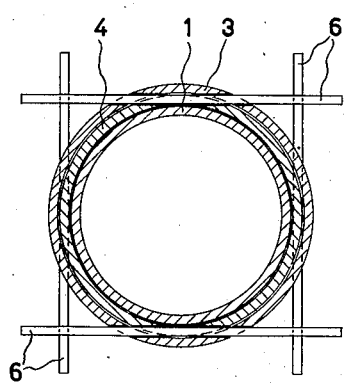
FIG·3
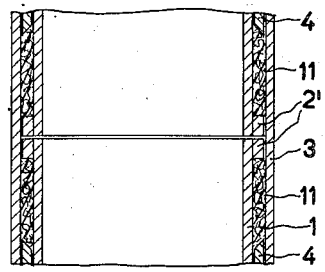
FIG·4
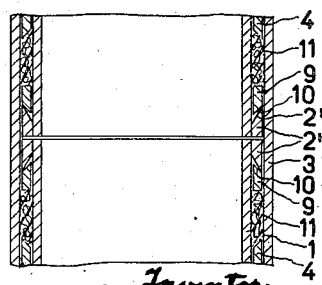
FIG·5
Inventor
Johan Friedrich Köhnke
by Michailis & Michailis, Attys.

Patented Feb. 6, 1940

2,189,070

UNITED STATES PATENT OFFICE 2,189,070

PIPE JOINT

Johan Friedrich Köhnke, Haarlem, Netherlands

Application May 3, 1938, Serial No. 205,677
In the Netherlands July 17, 1936

2 Claims. (Cl. 285—182)

The present invention relates to means for jointing pipes, more especially such as are used for supplying gas or fluid under high pressure. It is an object of the invention to provide means for jointing such pipes by means of simple and cheap parts which nevertheless assure a strong and reliable joint.

The invention is applied to the known pipe connection in which the ends of the pipes to be connected are inserted into a socket, the space between the pipes and the socket being then filled with packing material and closed at both ends by inserting a pressure ring. The socket is formed with two axially extending slits and the pressure rings with indentures registering with these slits, so that a wedge inserted into a slit and driven into the indenture and projecting through the other slit will force the pressure ring farther into the space between the socket and the pipe, thereby compressing the packing material.

The ends of the pipes are formed with a collar, which may be fixed to them by welding, or the ends of the pipe may be doubled-up so as to form a flange enclosing with the pipe body an acute angle. Alternatively the collars may be formed with a V-shaped groove on the side averted from the pipe ends, and rings of wedge-shaped cross section loosely embracing the pipes may be forced into these grooves so as to expand these collars or flanges against the inner wall of the surrounding socket.

In the drawing affixed to this specification and forming part thereof several embodiments of my invention are shown diagrammatically by way of example.

In the drawing

Figs. 1, 2 and 3 are an axial section, an elevation and a cross section on the line III—III in Fig. 1, respectively illustrating the first embodiment.

Fig. 4 is an axial section of a second, and

Fig. 5 a similar view of a third modification.

Referring to the drawing and first to Figs. 1-3, 1 are the pipes, 2 the collars formed at their ends, 3 the sockets, 4 the pressure rings, 5 the pairs of slits in the sockets, 6 the wedges, 7 the indentures formed in the walls of the pressure rings, 8 the flange on the pressure rings, 9, 10 the wedge-shaped rings and 11 the packing material.

When jointing the pipes 1, they are inserted into the socket 3, the wedge-shaped rings 9 are put into place between the pipe wall and the socket and the packing material 11 is filled in. Now the pressure rings 4 are shifted into the annular gaps, the wedges are pushed through the four pairs of slits 5 and the indentures 7 formed in the sockets (Fig. 3) and driven home by hammer blows, whereby the pressure rings are forced deeper into the gaps, the packing material is compressed between the sockets and the rings 9, and the rings 9 are forced into the angles or grooves of the collars, thereby forcing the collars against the inner wall of the sockets. By making the collars 2 longer than, f. i., 1½ times as long as, the width of the gap between the pipes and the socket, any tendency of the collars 2 to bend back under the pressure of the wedge faces 10 of the rings 9 results in a pressure exerted on the inner wall of the socket and consequently in a still more efficient closing of the joint. It may be desirable to promote this effect by making the wedge angle greater than the angle enclosed between the collars 2 and the pipes.

In order to facilitate assembling, the position of the indentures 7 may be indicated on the flanges 8 of the pressure rings.

While the wedge rings 9 might also be omitted, they have been found useful in eliminating any disadvantages which may arise from a splitting off of the collars 2 or from deficiencies in the packing material.

In the embodiment shown in Fig. 4 a ring 2' secured by welding on the end of each pipe replaces the collar 2 shown in Fig. 1. This ring may be undercut at 2", as shown in Fig. 5, whereby the same effect can be obtained in cooperation with the edge 10 of the pressure ring 9, as with the doubled-up collar 2.

The joint according to the invention affords the advantage that the pressure of the gas or liquid in the pipes tends to press the pipes 1 and rings 9 against packing 11 which, however, is held back by the rings 4. The higher the pressure, the stronger the packing is compressed and the better the joint is closed.

In order to subsequently tighten up the joint, it is only necessary to drive the wedges 6 a little further into the slits.

I wish it to be understood that I do not desire to be limited to the exact details of construction shown and described, for obvious modifications will occur to a person skilled in the art.

I claim:

1. In a pipe joint in combination, a pipe having a rebent flange surrounding the end of the pipe, said flange forming with said pipe a groove extending substantially parallel to the pipe wall, a packing ring of wedge-shaped cross-section projecting into the groove between said pipe and said flange, a sleeve surrounding the pipe ends to be joined together and means for forcing said wedge-shaped ring into said groove and said flange against the inner wall of said sleeve.

2. In a pipe joint in combination, a pipe having a rebent flange surrounding the end of the pipe, said flange forming with said pipe a groove extending substantially parallel to the pipe wall, a packing ring of wedge-shaped cross-section projecting into the groove between said pipe and said flange, a sleeve surrounding the pipe ends to be joined together and means for forcing said wedge-shaped ring into said groove and said flange against the inner wall of said sleeve, said means including a flanged pressure ring extending into the gap between said pipe and said sleeve, and into contact with said packing ring, pairs of slits in said sleeve and tangential indenturei, registering with said slits, in said flanged pressure ring, and wedges extending through said slits and indentures.

JOHAN FRIEDRICH KÖHNKE.